(12) United States Patent
Blase

(10) Patent No.: US 7,690,718 B2
(45) Date of Patent: Apr. 6, 2010

(54) POWER GUIDE CHAIN SYSTEM AND SLIDING DOOR SYSTEM

(75) Inventor: Günter Blase, Bergisch Gladbach (DE)

(73) Assignee: Igus GmbH, Cologne (DE)

( * ) Notice: Subject to any disclaimer, the term of this patent is extended or adjusted under 35 U.S.C. 154(b) by 1080 days.

(21) Appl. No.: 10/565,986

(22) PCT Filed: Jul. 21, 2004

(86) PCT No.: PCT/DE2004/001578

§ 371 (c)(1),
(2), (4) Date: Jan. 24, 2006

(87) PCT Pub. No.: WO2005/010400

PCT Pub. Date: Feb. 3, 2005

(65) Prior Publication Data

US 2006/0170244 A1    Aug. 3, 2006

(30) Foreign Application Priority Data

Jul. 24, 2003   (DE)  ................................ 103 33 834

(51) Int. Cl.
*B60J 5/06* (2006.01)
(52) U.S. Cl. ..................................... 296/155
(58) Field of Classification Search ................. 296/155; 49/360; 174/72 A, 72 C, 69, 135
See application file for complete search history.

(56) References Cited

U.S. PATENT DOCUMENTS 6,174,020 B1 *   1/2001   Knettle et al. ............... 296/155

(Continued)

FOREIGN PATENT DOCUMENTS

CA   2271377   8/2000

(Continued)

OTHER PUBLICATIONS

PCT International Search Report dated Dec. 21, 2004, received in corresponding Application No. PCT/DE2004/001578 (2 pgs).

(Continued)

*Primary Examiner*—H Gutman
(74) *Attorney, Agent, or Firm*—Grossman Tucker Perreault & Pfleger, PLLC

(57) ABSTRACT

The invention relates to a powered guide chain system (1), comprising a powered guide chain (3), for guiding cables (4), hoses or the like between a stationary and a mobile connection point, a driver (7) to which the powered guide chain (3) is connected via the mobile connection point, and a guide channel (8), which comprises a hollow profile with a passage (9) for the driver (7), extending in the longitudinal direction, whereby the powered guide chain (3) is guided into the guide channel (8) in the longitudinal direction thereof, forming two runs which are guided parallel to each other and connected to each other via a deviation area. The invention also relates to a sliding door system (2) for a vehicle, provided with said powered guide chain system (1). The aim of the invention is to obtain an easy and safe guidance of cables (4), hoses or the like in at least two directions. Said aim is achieved, whereby the driver (7) comprises a mobile arm (12) which protrudes from the guide channel (8) with a fastening side (13) for connection to a device movable in relation to the guide channel (8), the distance between the fastening side (13) and the guide channel (8) being changeable in a travel component transverse to the longitudinal direction of the guide channel (8).

4 Claims, 13 Drawing Sheets

U.S. PATENT DOCUMENTS

| | | | |
|---|---|---|---|
| 7,284,785 B2* | 10/2007 | Gotou et al. | 296/155 |
| 7,464,500 B2* | 12/2008 | Choi | 49/360 |
| 2005/0095903 A1* | 5/2005 | Stenzel et al. | 439/501 |
| 2007/0001485 A1* | 1/2007 | Jarolim | 296/208 |
| 2007/0157523 A1* | 7/2007 | Kuhnen et al. | 49/502 |

FOREIGN PATENT DOCUMENTS

| | | |
|---|---|---|
| DE | 199 05 022 | 8/2000 |
| DE | 199 05 336 | 8/2000 |
| DE | 199 48 852 | 8/2001 |
| JP | 11342807 | 12/1999 |
| JP | 2003025850 | 1/2003 |

OTHER PUBLICATIONS

German Examination Report dated Apr. 2, 2004, received in German priority Application No. 103 33 834.9 (3 pgs).

English language translation of Opposition letter dated Jan. 15, 2009 against European Patent Application No. 04762428.3.

English Translation of PCT International Preliminary Report on Patentability received in corresponding Application No. PCT/DE2004/001578 (5 pages).

* cited by examiner

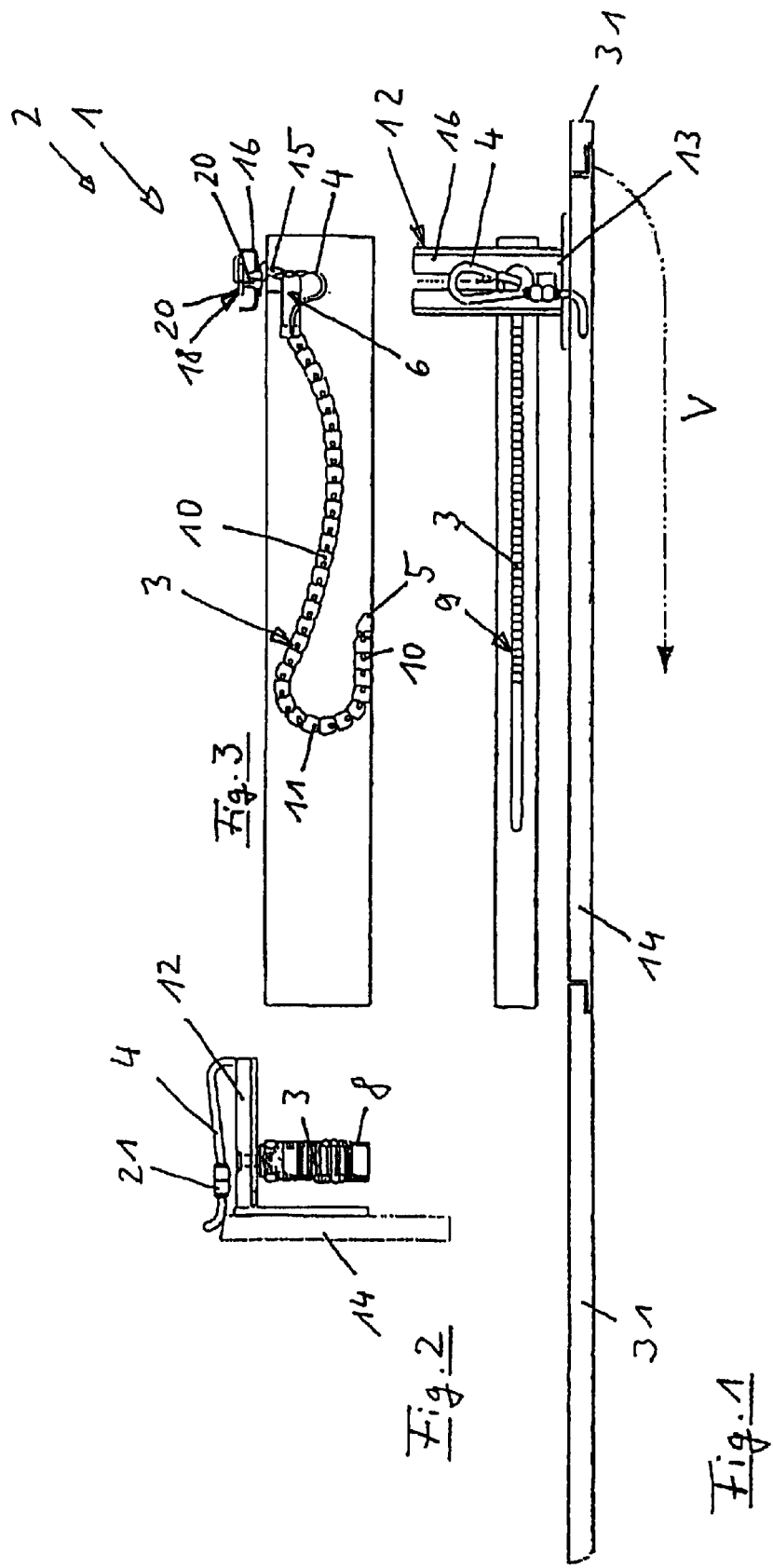

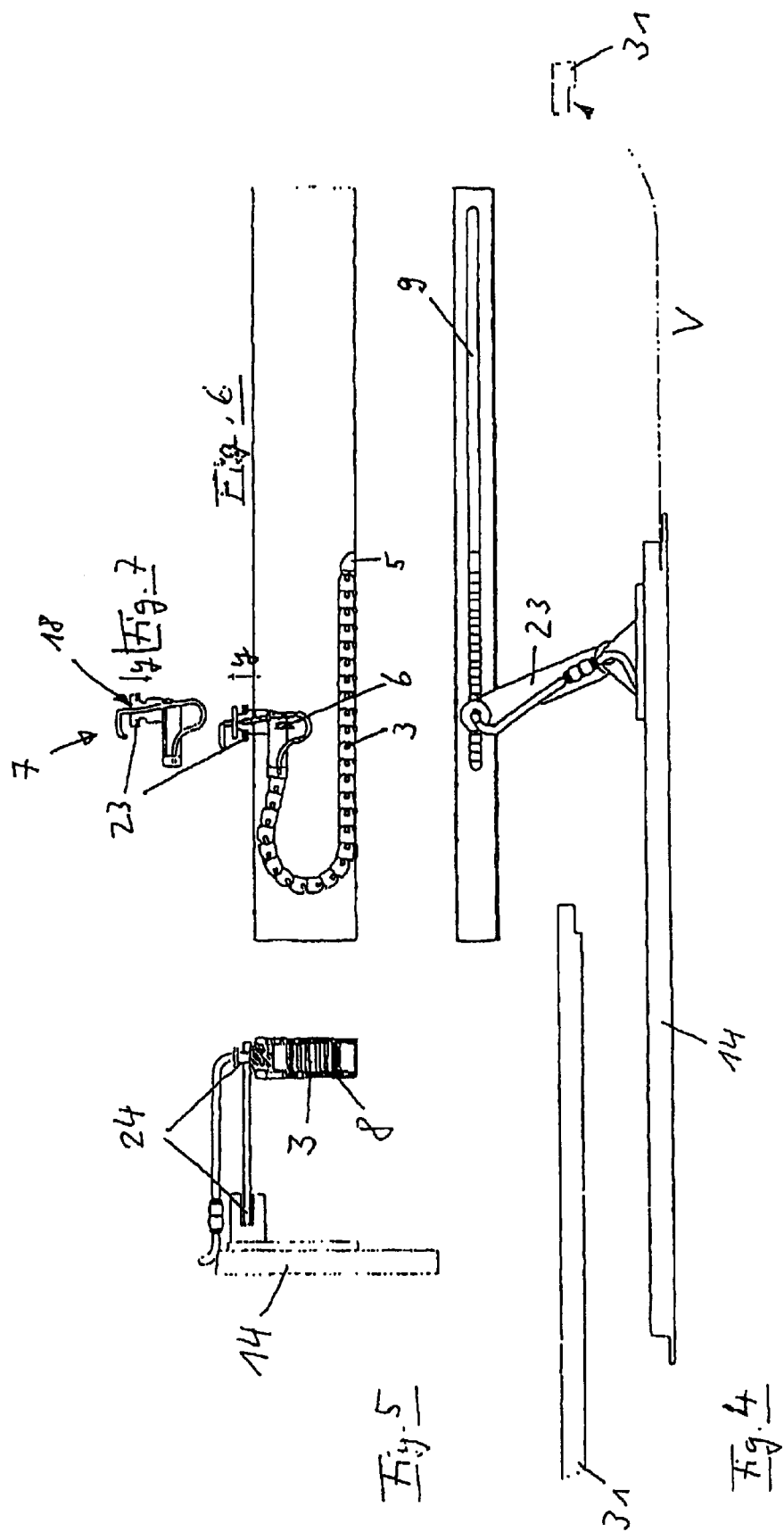

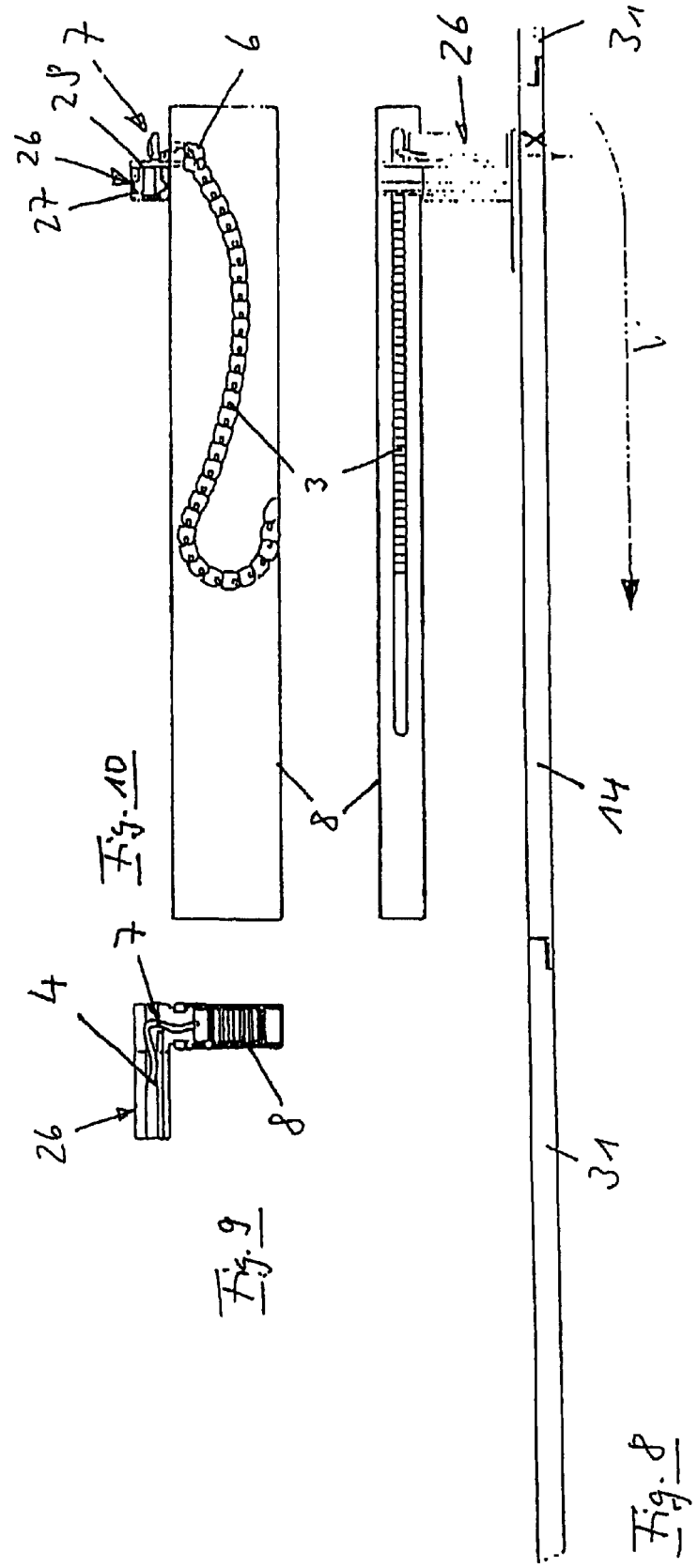

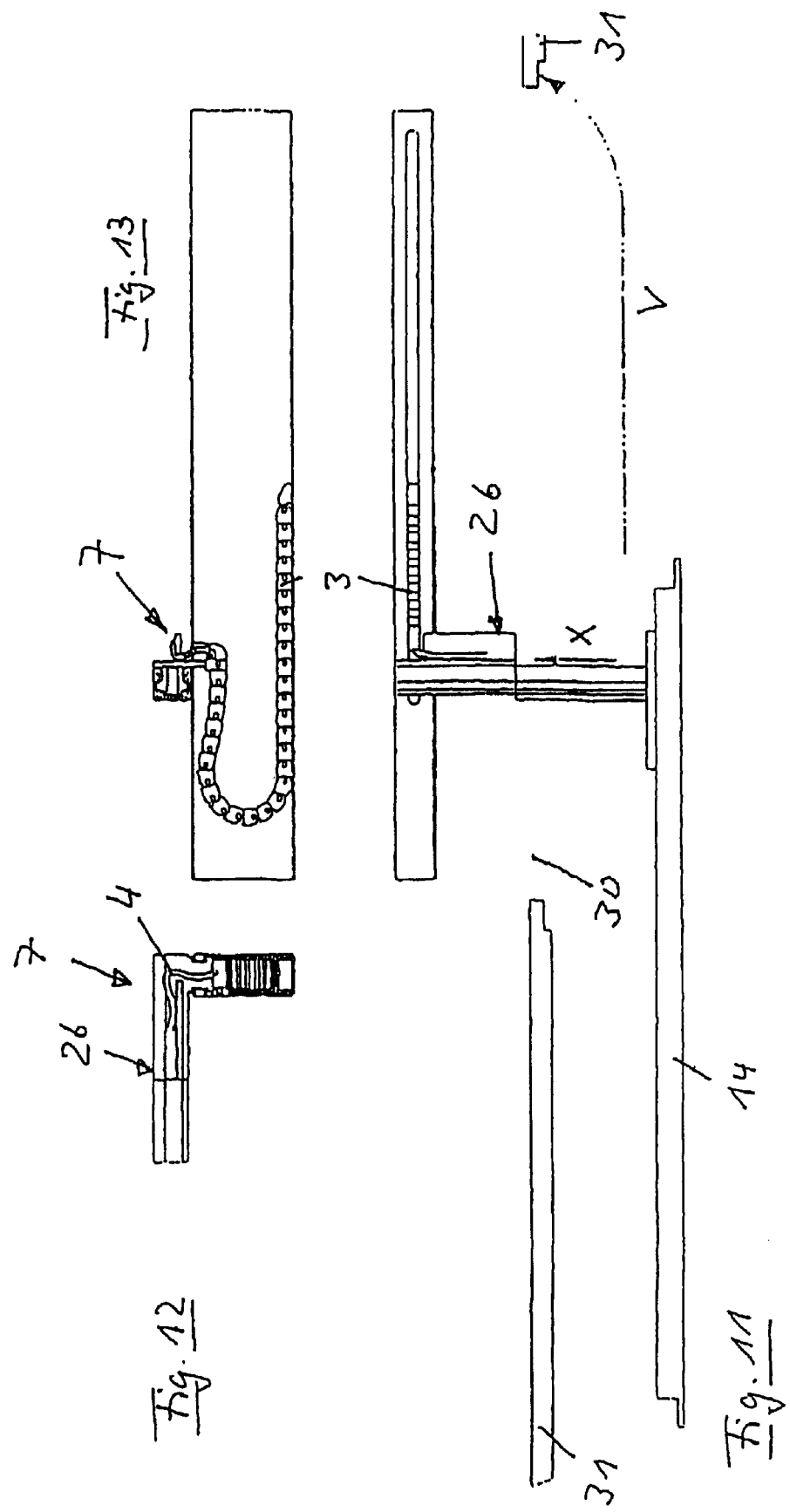

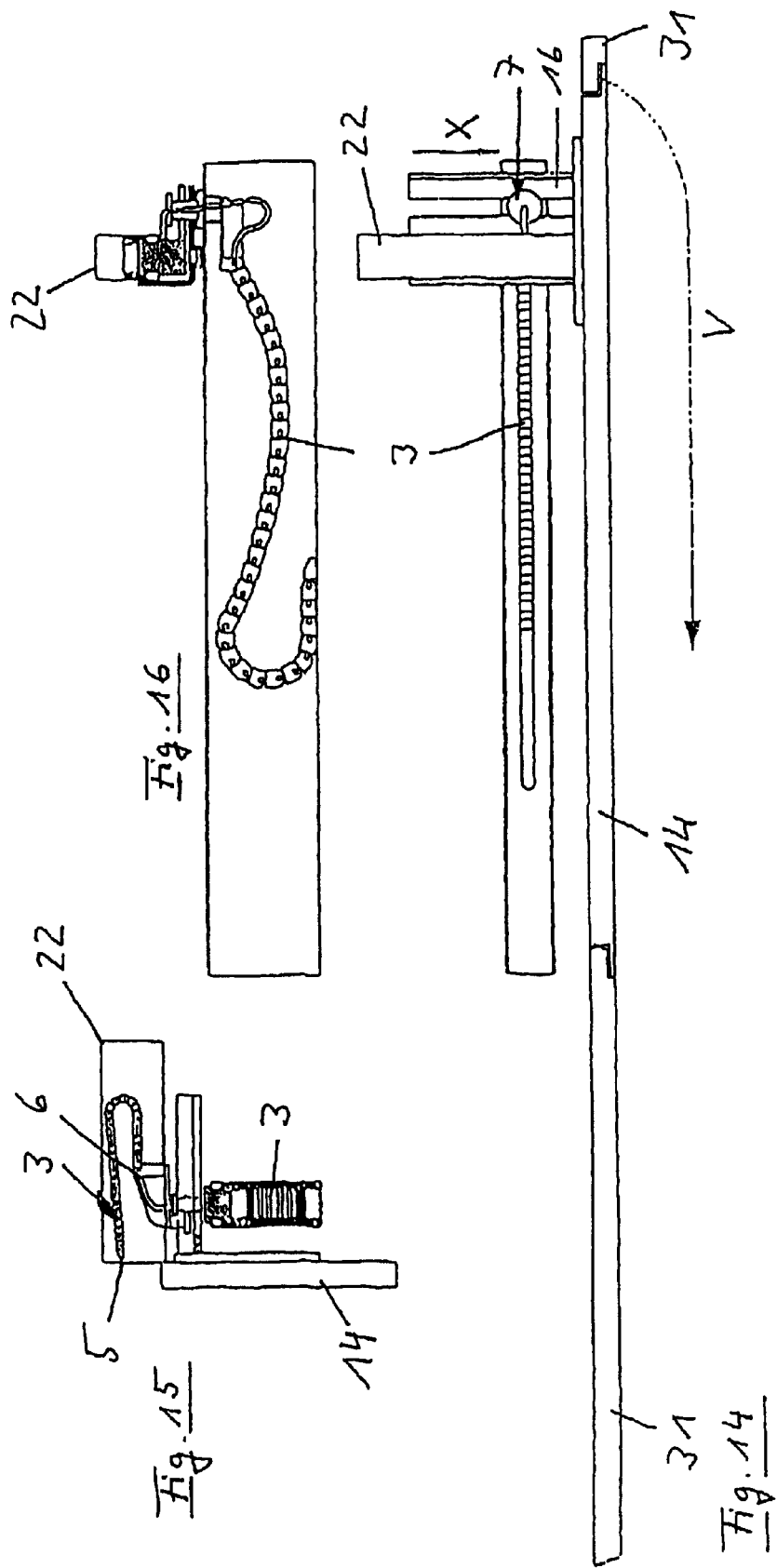

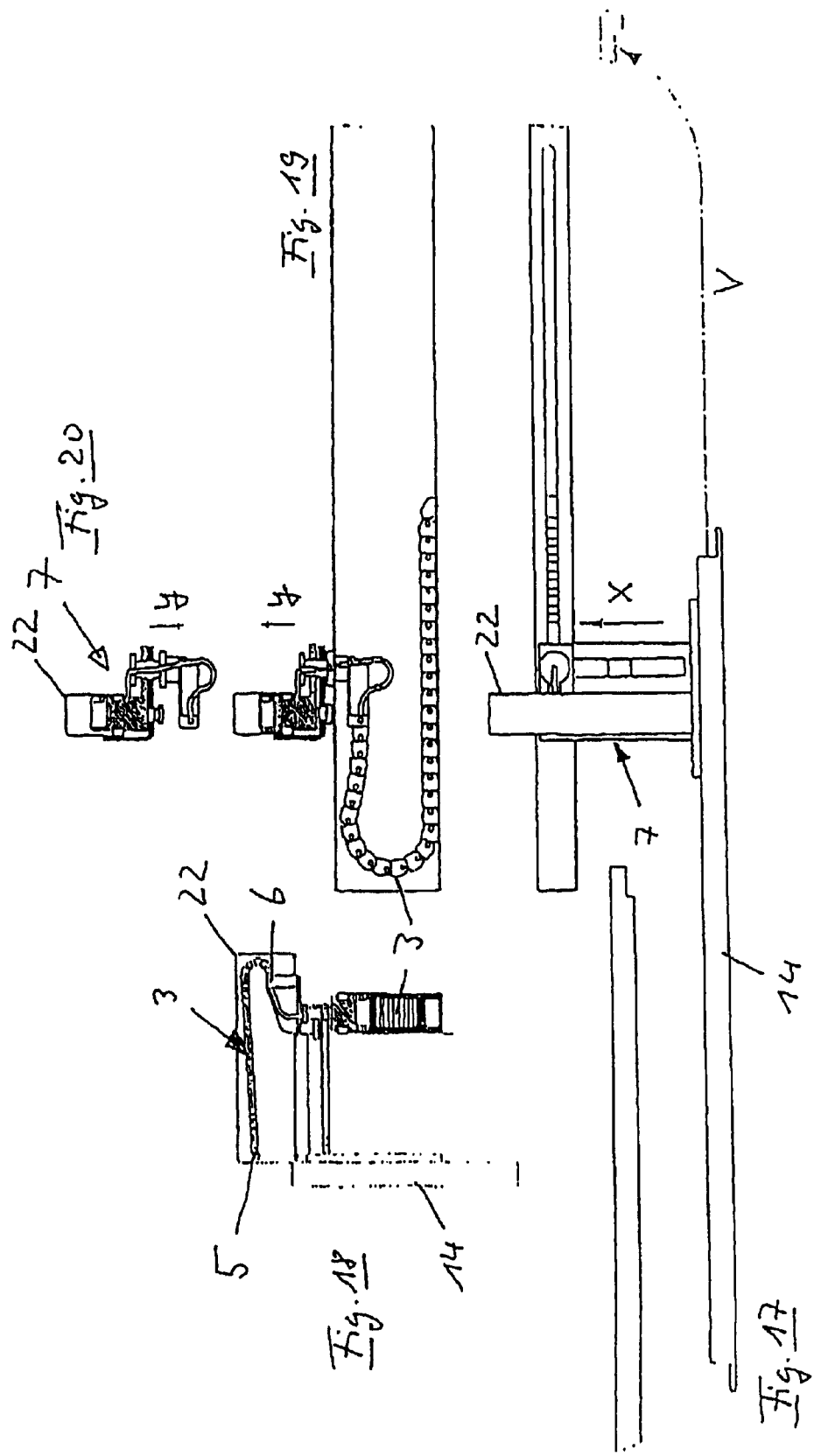

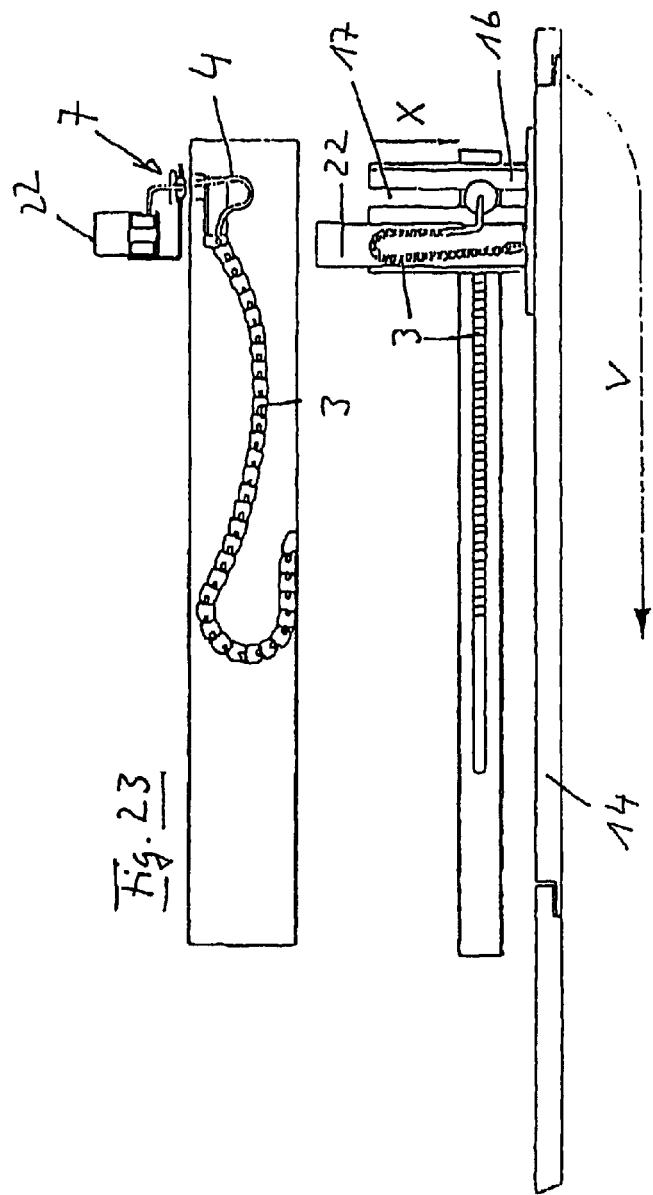
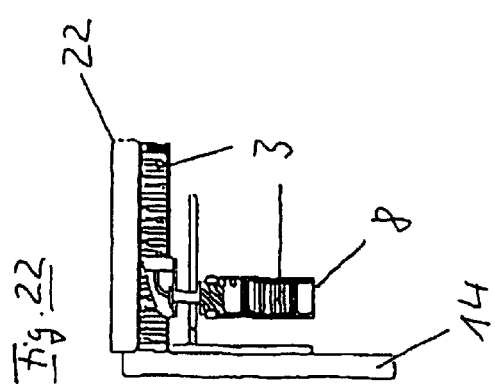

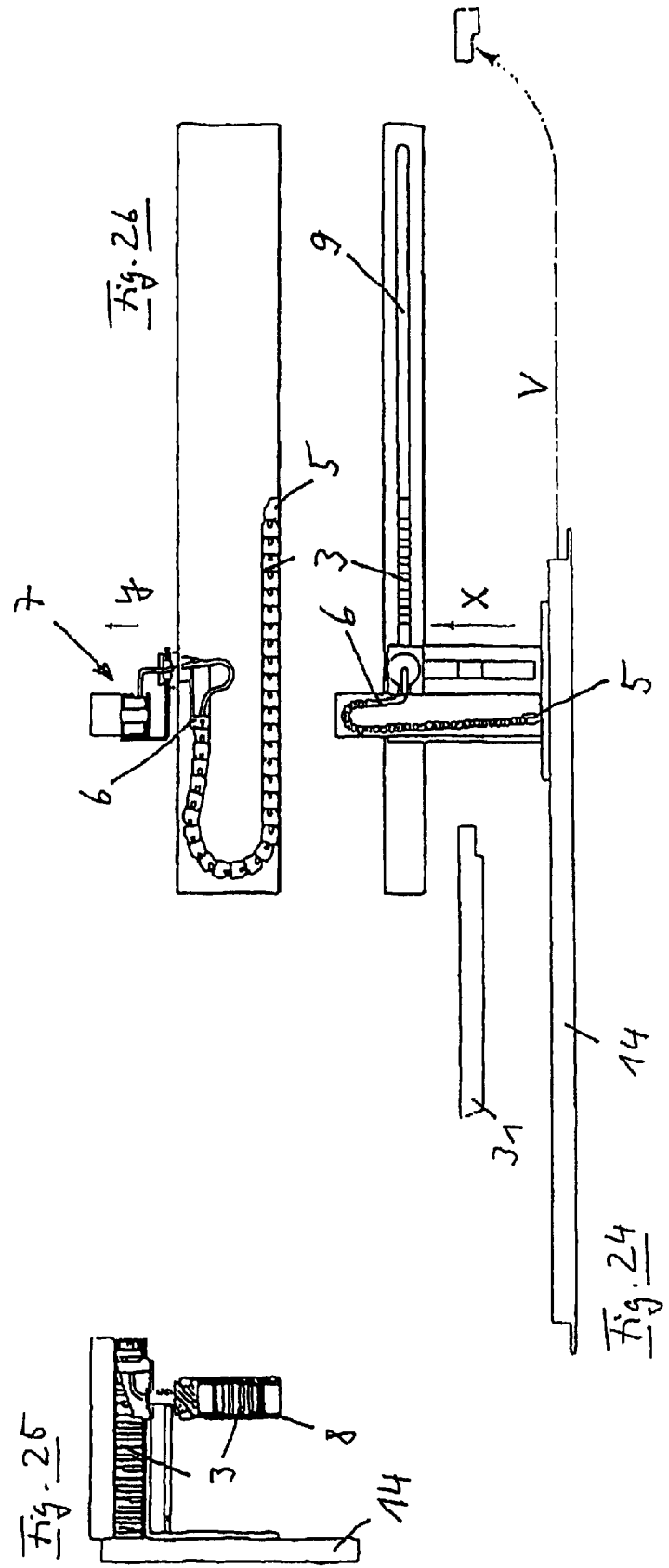

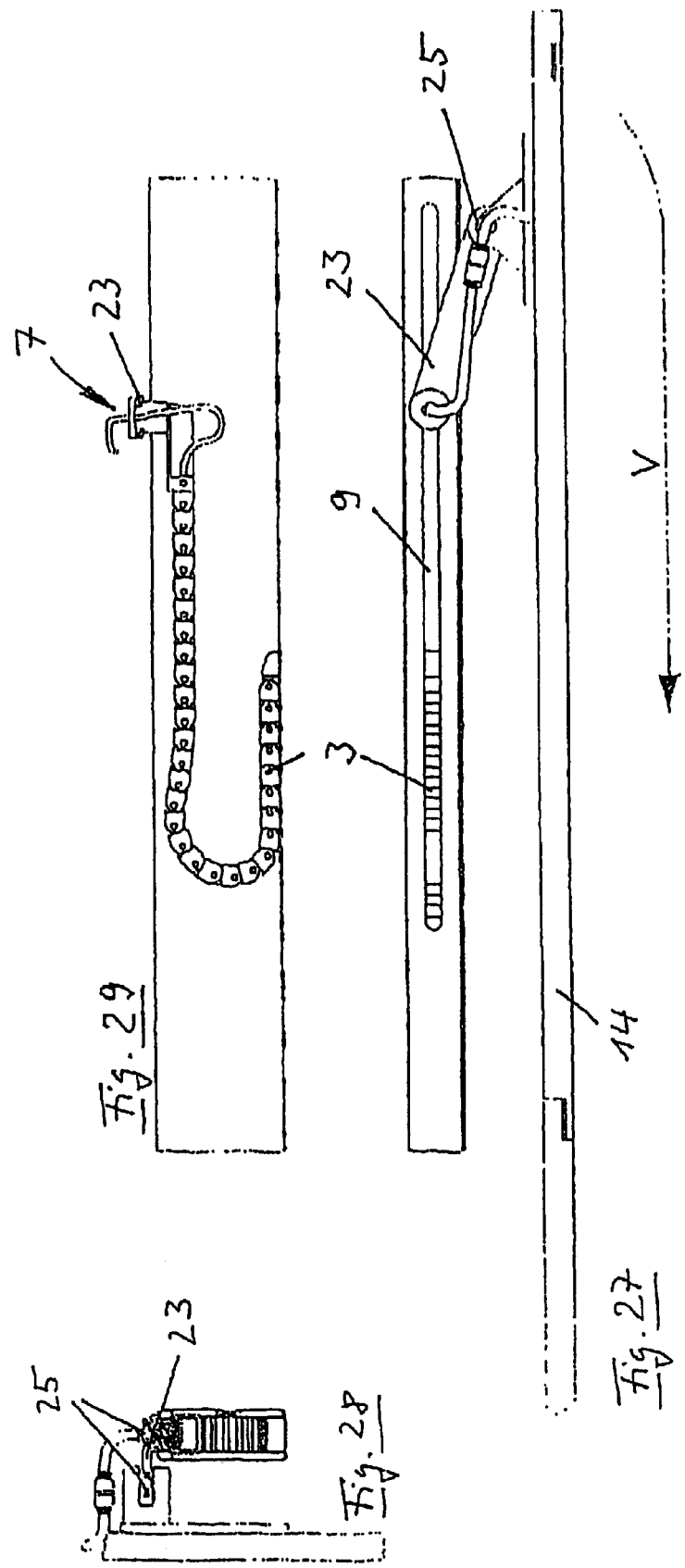

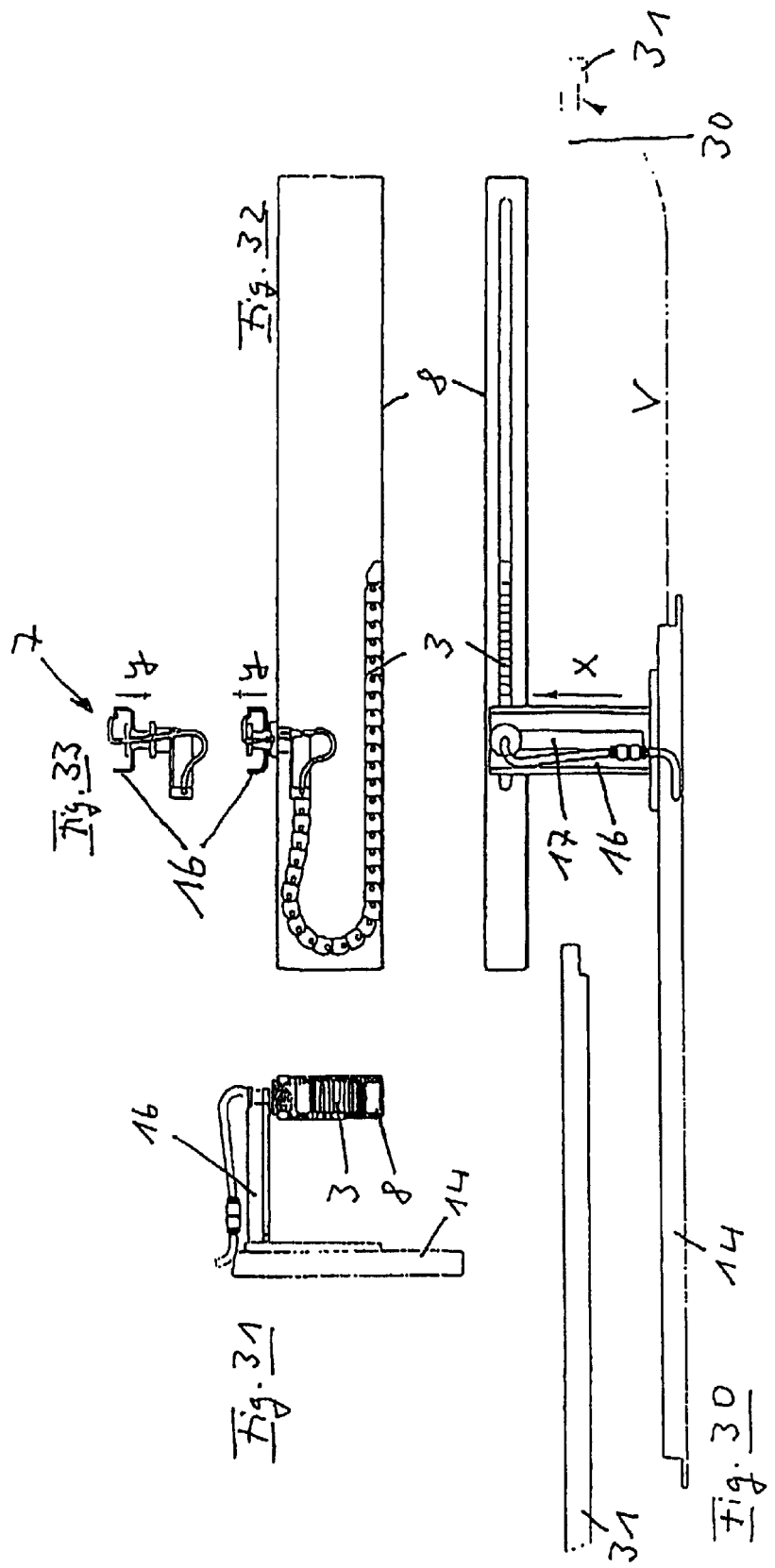

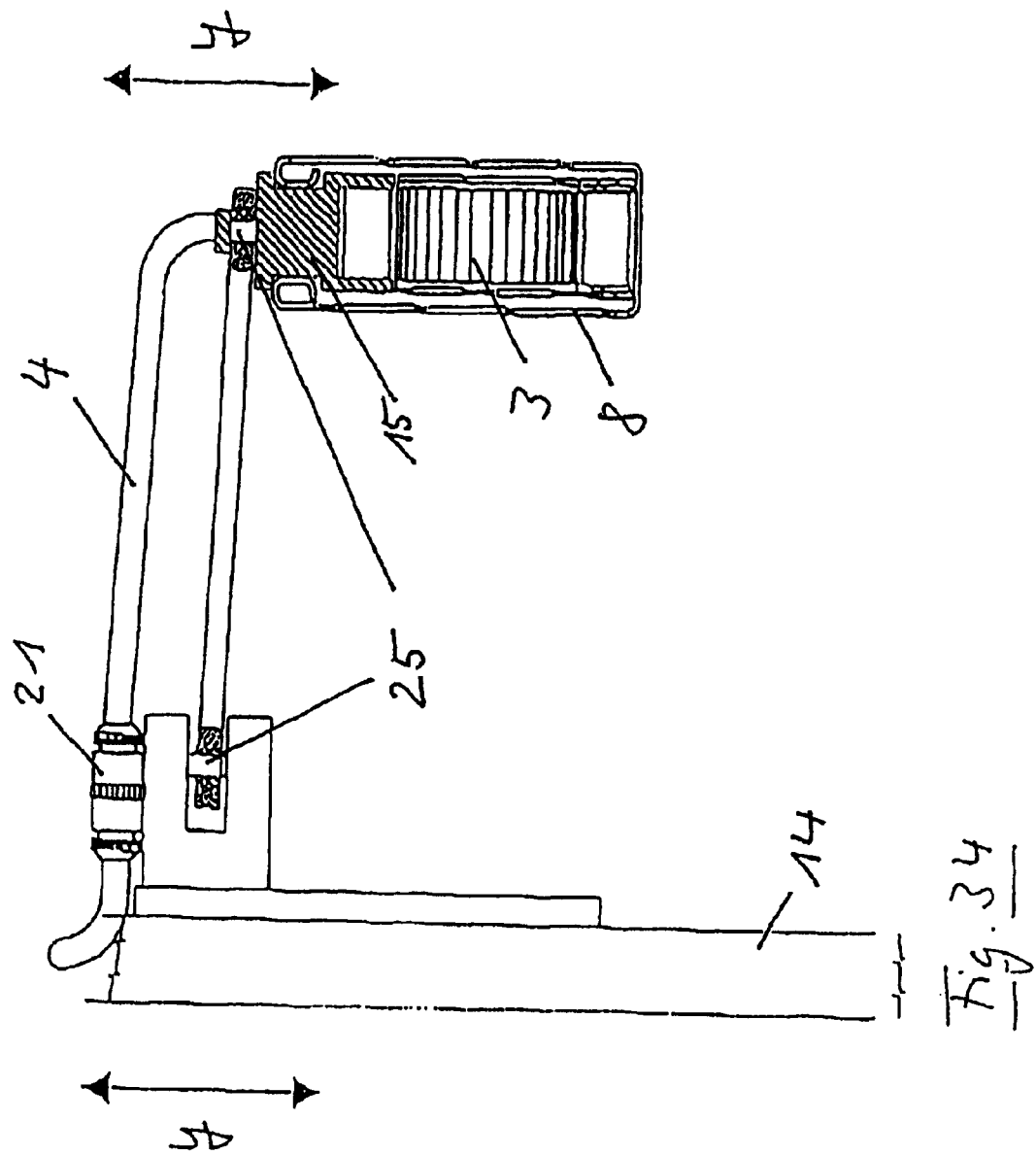

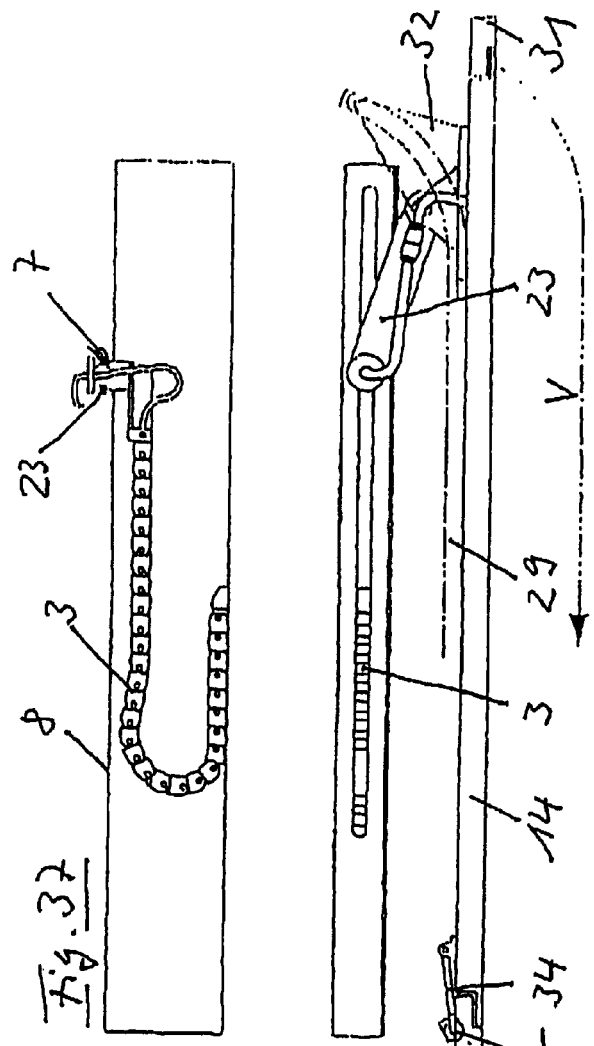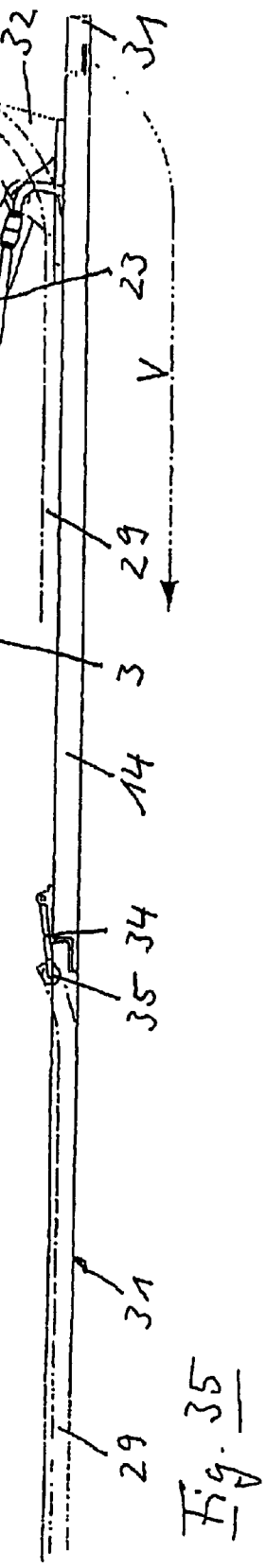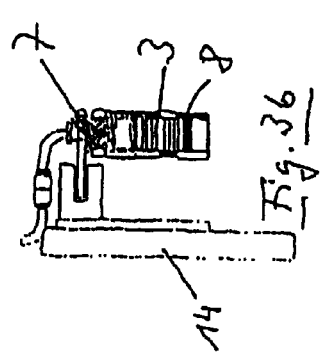

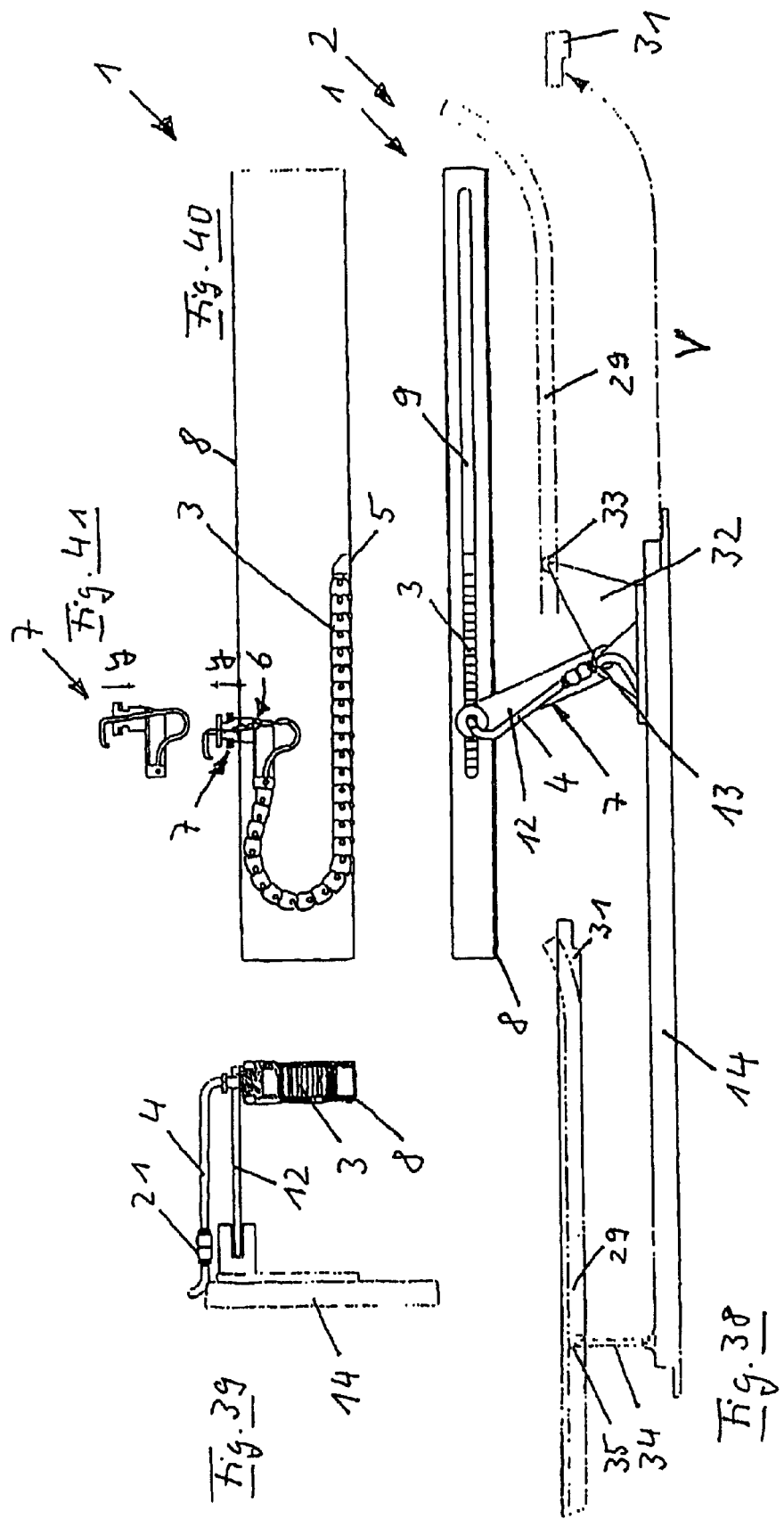

POWER GUIDE CHAIN SYSTEM AND SLIDING DOOR SYSTEM

CROSS-REFERENCE TO RELATED APPLICATIONS

This application claims the benefit of PCT/DE2004/001578, filed Jul. 21, 2004 which claims priority to DE 103 33 834.9, filed Jul. 24, 2003.

FIELD

The invention relates to an energy guide chain system comprising an energy guide chain for guiding cables, hoses or the like between a stationary and a movable connection point, and an entrainment portion to which the energy guide chain is connected by way of the movable connection point, wherein the energy guide chain is guided in the form of two runs which are guided in mutually parallel relationship and which are connected to each other by way of a deflection region, the entertainment portion has a movable arm which projects from the energy guide chain with a fastening side for connection to a apparatus which is movable relative to the fixed connection point and wherein the spacing between the fastening side and the energy guide chain is variable in a travel component in traverse relationship with the longitudinal direction of the runs of the energy guide chain. The invention further relates to a sliding door which for a vehicle comprising a vehicle body having a door opening, and a sliding door which for opening and closing is displaceable along a path which is non-linear relative to the vehicle body.

BACKGROUND

When guiding cables, hoses and the like, the problem which arises is that of guiding them in energy guide chain systems in such a way that they bridge over a non-linear path. Patent specification DE 199 48 852 C1 discloses an energy guide chain system for an internal pivotal door or folding door of a vehicle, in which the movable arm is integrated into a holding arrangement of the internal pivotal door, which is mounted longitudinally slidably and pivotably in a linear guide rail which extends lengthwise relative to the body. In that arrangement the movable arm is integrated into a holding arrangement with a guide roller of the internal pivotal door, which is longitudinally slidably and pivotably mounted in a linear guide rail extending lengthwise relative to the body. In order to achieve satisfactory guidance for the energy guide chain or for continuing with the cables, a comparatively complicated construction is required for the movable arm, with complicated and expensive cable guide means. In addition the energy guide chain system of DE 199 48 852 C1 is only suitable for linear displacement, and not for non-linear displacement, of the movable arm, in a non-linear guide rail. In addition eccentric mounting of the holding arrangement in the guide rail means that the cables can be subjected to a heavier loading during the movement of the internal pivotal door.

That problem is further solved in accordance with U.S. Pat. No. 6,174,020 B1 in such a way that the individual links of an energy guide chain are also pivotable relative to each other in the transverse direction of the direction of displacement of the energy guide chain. That arrangement means however that the cables, hoses and the like which are guided in the energy guide chain are bent to the same degree and thus mechanically loaded. U.S. Pat. No. 6,174,020 B1 also discloses the use of energy guide chains of that kind in sliding door systems. In that case the energy guide chain, except for a few guide elements, is guided freely in a region in the proximity of the door opening.

Therefore the object of the invention is to provide an energy guide chain system which has a simple connection between the energy guide chain and the fastening side and improved guidance for the energy guide chain and which makes it possible for cables, hoses and the like to be guided in such a way that they bridge over a non-linear path, under a low level of mechanical loading. A further object of the invention is to provide a sliding door system having reliable guidance for the energy guide chain.

SUMMARY

That object is attained in that there is provided a guide channel in the form of a hollow profile with two oppositely disposed side walls against which the side walls of the runs and the deflection region of the energy guide chain bear with a slight clearance, wherein the hollow profile has a passage extending in the longitudinal direction for the entrainment portion, and that the entrainment portion is arranged entirely outside the space extending between the two runs.

By virtue of the arrangement of the entrainment portion outside the space extending between the two runs, it is structurally possible for the movable arm to be capable of engaging the movable connection even in a form of movement which does not correspond to that of the energy guide chain, without thereby disturbing the proper movement of the energy guide chain. The possibility of varying the spacing between the fastening side of the arm and the entrainment portion means that there is proposed an energy guide chain system in which the cables can be guided on a displacement path in the longitudinal direction of the guide channel and in a travel component transversely with respect to the longitudinal direction of the guide channel, that is to say in a movement with two linear degrees of freedom. The energy guide chain is connected to the entrainment portion which is guided in the passage, and the chain preferably bears with a slight clearance against the side walls of the guide channel. In that way the energy guide chain is linearly guided in the guide channel, that is to say it is displaceable in the longitudinal direction of the guide channel, while avoiding a transverse movement. That arrangement provides that the energy guide chain as well as the cables arranged therein are subjected to a minimum mechanical loading. In that case the guide channel itself additionally forms a protection space for the energy guide chain and also for its movable connection to the entrainment portion.

In principle the guide channel can be arranged in the position of installation at any angle relative to the vehicle floor, in the sliding door system. However, a horizontal or vertical arrangement of the guide channel is preferred, in which the energy guide chain is then arranged lying on its side or standing vertically.

In a development of the invention the entrainment portion has a sliding block which is connected to the movable arm and which forms the movable connection point and is arranged displaceably in the passage of the guide channel. In that case it is in contact with the side walls of the passage of a tongue-and-groove connection, wherein, at the sides towards the side walls of the passage, the sliding block has a respective groove in the longitudinal direction of the guide passage, into which groove the side walls of the passage engage as the tongue.

In a development of the invention it is proposed that the movable arm is in the form of a telescopic arm. In that case a preferred configuration of the telescopic arm is one which has an outer U-shaped telescopic member and an inner U-shaped telescopic member, which are arranged displaceably one within the other by way of a tongue-and-groove connection. In that case the two U-shaped profiles are preferably arranged in mutually parallel relationship and engage with their limbs into each other in such a way that the limbs of the outer telescopic member bear displaceably at the outside against the limbs of the inner U-shaped profile. In order to achieve a force-locking connection in the direction of the limbs, provided at the inside of the limbs of the outer U-shaped profile is a respective guide groove which extends in the longitudinal direction of the respective U-shaped profile and into which engage guide projections which are arranged at the free ends of the inner U-shaped profile and which correspond to the guide grooves, and are mounted displaceably in the longitudinal direction. Abutments are desirably provided to limit the displacement travel of the U-shaped profiles one within the other. To assemble the two U-shaped profiles to afford the telescopic arm, it is proposed that the limbs of the telescopic members can be elastically bent away from each other or pressed together, at their free ends, so that the projections at the inside of the limbs of the outer profile are displaceable in the longitudinal direction of the limbs towards the guide grooves and can engage into the guide grooves. It will be appreciated that it is also possible to envisage other arrangements of guide grooves and guide projections which permit displacement of the U-shaped profiles one within the other and parallel to the longitudinal direction thereof.

It is also possible to envisage other profiles for the telescopic members, which by way of their cross-sectional shape prevent rotation of the telescopic members relative to each other, such as for example hollow profiles of polygonal and non-round cross-section.

In another configuration of the invention the movable arm is in the form of a sliding arm which is connected displaceably in its longitudinal direction to the movable connection point. Preferably the sliding arm has a slot which extends in its longitudinal direction and through which extends a pin which is fixedly connected to the movable connection point. The pin preferably has a pin neck and a pin head arranged at the free end, wherein the sliding arm embraces the pin neck for connecting the sliding arm to the movable connection point. In that arrangement the pin neck can be of a length which permits an additional movement of the sliding arm in the longitudinal direction of the pin. In another configuration the pin head can be in the form of a ball joint head engaged by the sliding arm with a ball joint socket of suitable configuration.

In a further configuration of the invention the movable arm is in the form of a pivot arm which at the fastening side is pivotably connected by way of a joint to a holding portion connected to the movable apparatus, and which with its side towards the movable connection point is pivotably connected by way of a further joint to a further holding portion connected to the movable connection point. In that arrangement the joints can be in the form of ball joints, thereby achieving a particularly great degree of mobility of the arm with respect to the guide channel.

In a development of the invention the movable arm has a channel for guiding the cables, hoses and the like from the movable connection point to the fastening side. The channel thereby protects the cables, hoses and the like guided therein. In order to be adapted to the variable spacing between the fastening side and the guide channel in a travel component in transverse relationship with the longitudinal direction of the guide channel, the cables, hoses and the like can be guided in the channel in a loop or in a flexibly deflectable spiral shape. For better guidance of the cables, the channel can have an energy guide chain for receiving cables, hoses and the like, which in the channel is connected fixedly at the fastening side of the movable arm and which is connected at its movable end to the movable connection point of the first energy chain. In that case the two energy guide chains with the associated guide channel and channel respectively can in principle be arranged at any angle relative to each other. Preferred arrangements however are those in which the guide channel, in the installation position, is arranged in a horizontal or vertical position and the channel is also arranged in a horizontal or vertical position, in the sliding door system. Further guidance for the cables, hoses and the like in the channel with the second energy guide chain provides that the cables, hoses and the like are particularly effectively protected from an external mechanical loading.

It is also possible for the arm to be so designed that it embodies the principle of the telescopic arm, the sliding arm and/or the pivot arm in combination.

In order to provide a sliding door system having a reliable guidance action for an energy guide chain, provided for a sliding door system of the kind set forth in the opening part of this specification is the above-described energy guide chain system according to the invention which is arranged adjoining the door opening in the vehicle body or the sliding door and serves for guiding cables, hoses or the like from the vehicle body to the sliding door, wherein the sliding door or the vehicle body respectively forms the apparatus which is movable relative to the guide channel.

The strictly linear channel provides for precise straight-line guidance of the energy guide chain. In addition, the arm connected to the movable connection point makes it possible to provide for further guidance for the cables, hoses or the like in a transverse movement relative to the guide channel, which is independent of the restricted curvature options of an energy guide chain in accordance with the state of the art, which allows pivotability of its chain links in transverse relationship with the direction of displacement. In addition, in the proposed sliding door system, the energy guide chain is only minimally exposed in the guide channel to the travel dynamics which are determined for example by shocks, rolling movements, inclined positions and centrifugal forces. The guide channel further affords protection from mechanical damage and obstruction and impediment and from dirt.

In a particular development the guide channel can be as good as entirely closed with a sealing lip, wherein the movable arm can engage sealingly through the sealing lip, for connection to the movable connection point. A further advantage is that it is possible to use standard energy guide chains which, in terms of their design, do not need to have any regard to a possible transverse movement, in which case they can therefore be lighter and smaller or also heavier and more stable, depending on the respective demands involved. The energy guide chain system proposed for the sliding door system can preferably be used not just in the floor region. An upper installation option, that is to say at the upper edge of the door, is also a possibility, so that the proposed energy guide chain system can be installed at the upper door edge or the lower door edge, depending on the respective kind of vehicle body. Preferably the sliding door forms the apparatus which is movable relative to the guide channel.

In a development of the sliding door system provided adjoining the door opening of the vehicle body and extending in parallel relationship with the path of the sliding door, which is non-linear relative to the vehicle body, is at least one correspondingly non-linear guide rail in which the sliding door is mounted displaceably by way of a holding apparatus.

In a preferred development of the sliding door system it is proposed that the holding apparatus has a holding arm which is fastened in the region of the sliding door, which is the leading region in the direction of travel of the vehicle, which holding arm at its free end has a pinion drivable by way of a motor drive arranged in the sliding door, and that provided in the guide rail is a rack into which the pinion engages for displacement of the sliding door. That arrangement provides that in known manner the sliding door is driven by the pinion along its non-linear path of travel, wherein the cables necessary for the motor drive are guided by way of the energy guide chain system according to the invention from the vehicle body to the motor drive which is disposed in the sliding door. It is also possible for the motor drive to be connected to the pinion by way of a movable drive shaft.

It will be appreciated that it is possible for other cables, hoses and the like, for example for a motor drive of a window lifting arrangement, for heating the windows or leading to a window washing installation arranged in the sliding door to be guided by way of the energy guide chain system from the vehicle body into the pivotable sliding door.

In a preferred configuration the rack and the guide rail are made in one piece. It is further proposed that, in a preferred development, the rack and the guide rail are made from plastic material.

In a development of the invention the holding apparatus has a pivot stirrup which is fastened to the rear region of the sliding door and which is pivotably connected to the sliding door about a respective pivot axis which is perpendicular in the installation position and is pivotably and slidably mounted with the other end in a further guide rail. In that arrangement the pivot stirrup is preferably arranged in the part of the sliding door, which is the rear part in the direction of travel of the vehicle. It is further proposed that the guide has a slot which faces laterally outwardly and into which the pivot stirrup engages in the form of a T-shaped anchor.

Instead of the T-shaped anchor it is possible to provide a roller system which is arranged rollably in the guide rail.

BRIEF DESCRIPTION OF THE DRAWINGS

The present invention is described in greater detail hereinafter by means of a number of embodiments by way of example, which are illustrated in the drawing in which:

FIG. 1 shows a plan view of an energy guide chain system with a sliding door connected thereto and embedded in a vehicle body, FIG. 2 shows a cross-sectional view of the arrangement of FIG. 1, FIG. 3 shows a view in longitudinal section of the energy guide chain system of FIG. 1, FIG. 4 shows a further configuration of the energy guide chain system with a sliding door connected thereto and pivoted out of a vehicle body, FIG. 5 shows a cross-sectional view of the energy guide chain system with the outwardly pivoted sliding door, FIG. 6 shows a side view of the energy guide chain system, FIG. 7 shows a portion from FIG. 6, but with an engaging pivot arm in an altered position, FIG. 8 shows a plan view of a further configuration of the energy guide chain system with connected sliding door, FIG. 9 shows a view in cross-section of the energy guide system, FIG. 10 shows a view in longitudinal section of the energy guide chain system, FIG. 11 shows the energy guide chain system of FIG. 8 but with the sliding door pivoted outwardly, FIG. 12 shows the energy guide chain system of FIG. 9 but with a deflected telescopic arm, FIG. 13 shows the energy guide chain system of FIG. 10 but in a different displacement position of the energy guide chain, FIG. 14 shows an energy guide chain system as shown in FIG. 1 but with an additional channel, FIG. 15 shows a view in cross-section of the energy guide chain system, FIG. 16 shows a view in longitudinal section of the energy guide chain system, FIG. 17 shows the energy guide chain system of FIG. 14, but with the sliding door pivoted outwardly, FIG. 18 shows a view in cross-section of the energy guide chain system of FIG. 17, FIG. 19 is a view in longitudinal section of the energy guide chain system of FIG. 17, FIG. 20 shows a portion from FIG. 19 but with an altered working position, FIG. 21 shows an energy guide chain system as shown in FIG. 14 but with a channel in section and a horizontally disposed energy guide chain, FIG. 22 shows a view in cross-section of the energy guide chain system shown in FIG. 21, FIG. 23 shows a view in longitudinal section of the energy guide chain system shown in FIG. 21, FIG. 24 shows the energy guide chain system shown in FIG. 21 but with the sliding door pivoted outwardly, FIG. 25 shows a view in cross-section of the energy guide chain system shown in FIG. 24, FIG. 26 shows a view in longitudinal section of the energy guide chain system shown in FIG. 24, FIG. 27 shows the energy guide chain system shown in FIG. 4 but with a sliding door pivoted back in the vehicle body, FIG. 28 shows a view in cross-section of FIG. 27, FIG. 29 shows a view in longitudinal section of FIG. 27, FIG. 30 shows an energy guide chain system as shown in FIG. 1 but with the sliding door pivoted outwardly, FIG. 31 shows a view in cross-section of the energy guide chain system shown in FIG. 30, FIG. 32 shows a view in longitudinal section of the energy guide chain system shown in FIG. 30, FIG. 33 shows a portion from FIG. 32 but with an altered working position, FIG. 34 shows a view in cross-section in FIG. 28 but with an altered working position, FIG. 35 shows an energy guide chain system as shown in FIG. 27 but with further elements of the sliding door system, FIG. 36 shows a view in cross-section of the energy guide chain system shown in FIG. 35, FIG. 37 shows a view in longitudinal section of the energy guide chain system shown in FIG. 35, FIG. 38 shows a view of the energy guide chain system shown in FIG. 35 but with the sliding door pivoted outwardly, FIG. 39 shows a view in cross-section of the energy guide chain system shown in FIG. 38, FIG. 40 shows a view in longitudinal section of the energy guide chain system shown in FIG. 38, and FIG. 41 shows a portion from FIG. 40 but with an altered working position.

DETAILED DESCRIPTION

FIGS. 1 to 41 show various views and portions of various embodiments of an energy guide chain system 1 according to the invention, which is embraced by a sliding door system 2, wherein for the sake of enhanced clarity of the drawing further elements of the sliding door system 2 are only shown insofar as they are necessary for comprehension of the invention.

The energy guide chain system 1 has an energy guide chain 3 for guiding cables 4, hoses and the like between a fixed connection point 5 and a movable connection point 6. There is also provided an entrainment portion 7 to which the energy guide chain 3 is connected by way of the movable connection point 6, and a guide channel 8 which has a hollow profile with a passage 9 extending in the longitudinal direction, for the entrainment portion 7. In this case the energy guide chain 3 is guided in the guide channel 8 in the longitudinal direction of the guide channel 8 in the form of two runs 10 which are guided in mutually parallel relationship and which are connected together by way of a deflection region 11. The entrainment portion 7 has a movable arm 12 which projects from the guide channel 8 with a fastening side 13 for connection to a sliding door which is movable relative to the guide channel 8, wherein the spacing between the fastening side 13 and the guide channel 8 is variable in a travel component in transverse relationship with the longitudinal direction of the guide channel 8.

The entrainment portion 7 has a sliding block 15 which is connected to the movable arm 12 and which forms the movable connection point 6 and which is arranged displaceably in the passage 9 of the guide channel 8. In FIGS. 1 to 3 and in FIGS. 30 to 33 the movable arm 12 is in the form of a sliding arm 16 which is connected displaceably in its longitudinal direction to the movable connection point 6. The sliding arm 16 has a slot 17 which extends in its longitudinal direction and through which extends a pin 18 fixedly connected to the movable connection point 6. The pin 18 has a pin head 19 and a pin neck 20.

The cables 4 which are guided in the energy guide chain from the fixed connection point 5 to the movable connection point 6 are guided by the entrainment portion 7 and the pin 18 through the passage 9 outwardly out of the guide channel 8 and are passed by way of the sliding arm 16 in a loop to the sliding door.

In this case a releasable cable connection 21 is provided between the sliding door 14 and the loop of the cables 4. By virtue thereof and by means of the slot 17 in the sliding arm 16, which is open towards the sliding block 15, the sliding door 14 can be connected to the energy guide chain system 3 without complication and cost.

As a departure from FIGS. 1 to 3, FIGS. 30 to 33 show the sliding door 14 in a pivoted-open position, that is to say the sliding door 15 has covered a non-linear sliding path V from the closed position shown in FIG. 1 to the open position in FIG. 30. In the open position the spacing between the movable connection point 6 and the fastening side 13 is also at its maximum. As demonstrated by the arrow X in FIG. 30 the sliding arm 16 is displaceable in the X-direction along the pin 18 to close the sliding door 14.

In addition FIGS. 32 and 33 show two different positions of the sliding arm 16 which is arranged displaceably along the indicated Y-direction over the pin neck 20, that is to say being arranged displaceably in the direction in respect of height in the installation position. FIGS. 14 to 26 show a sliding door system 2 with an energy guide chain system 1, wherein the energy guide chain system 1 differs from the energy guide chain system 1 shown in FIGS. 1 to 3 in that the movable arm 12 has a channel 22 for guiding the cables 4, hoses and the like from the movable connection 6 to the fastening side 13. In this case, disposed in the channel is a further energy guide chain 3 for receiving the cables 4, hoses and the like, which in the channel 22 is connected fixedly to the fastening side 13 of the movable arm 12 and which at its movable end is connected to the movable connection point 6. In this case, as shown in FIGS. 15 and 18, the energy guide chain 3 can be in a standing position in the installed condition or, as shown in FIGS. 21, 22, 24 and 25, it can be in a lying position. In addition, as already described with reference to the preceding Figures, the sliding door system 2 is shown in FIGS. 14 to 16 and 21 to 23 with a sliding door 14 in the closed position and in FIGS. 17 to 20 and FIGS. 24 to 26 with a sliding door 14 in the open position.

FIGS. 4 to 7 show a further embodiment of the sliding door system with an energy guide chain system 1, wherein the movable arm 12 is in the form of a pivot arm 23 which is pivotably connected at the fixing side 13 by way of a joint 24 to a holding portion 25 which can be connected to the sliding door 14, and with its side which is towards the movable connection point 16, it is pivotably connected by way of a further joint 24 to a holding portion 25 connected to the movable connection point 6. In this case, the joints 24 in FIGS. 4 to 7 are in the form of pivot joints which permit simple pivotal movement of the pivot arm 23 about a respective perpendicular pivot axis.

As a departure therefrom the joints 24 of the embodiments shown in FIGS. 27 to 29 are in the form of ball joints which allow a greater degree of mobility of the pivot arm 23. In FIG. 34 this construction is shown in a sectional view, in which respect the double-headed arrows Y shown at the two sides are intended to make it clear that a movement of the sliding door 14 and/or of the guide channel 8 in a perpendicular direction in the installed position is possible by virtue of those ball joints 25.

FIGS. 8 to 13 show a sliding door system 2 with an energy guide chain system 1, wherein the movable arm 12 is in the form of a telescopic arm 26. As indicated in FIGS. 8 to 13, the arm 26 has an outer U-shaped telescopic member 27 and an inner U-shaped telescopic member 28, which are arranged displaceably one within the other by way of a tongue-and-groove connection as has already been described hereinbefore. As in the preceding examples, in this case too the sliding door system 2 is shown in two positions, an open position with the sliding door 14 open in FIGS. 11 to 13 and a closed position with the sliding door 14 closed in FIGS. 8 to 10.

FIGS. 35 to 41 show the sliding door system 2 with the energy guide chain system 1, again in an open position and in a closed position, wherein the energy guide chain system 1 in the example selected here substantially corresponds to the energy guide chain system 1 shown in FIGS. 30 to 33. In addition, as elements which have not been illustrated hitherto, these Figures show two non-linear guide rails 29 which extend in adjoining relationship with a door opening 30 on a vehicle body 32 and in parallel relationship with the path, which is non-linear relative to the vehicle body 31, as the sliding path V of the sliding door 14. The sliding door 14 is supported slidably by way of a holding apparatus in those guide rails 29. The holding apparatus has a holding arm which is fixed in the region of the sliding door 14, being the front region in the direction of travel, and which at its free end has a pinion 33 drivable by way of a motor drive (not shown here). In addition, provided in the corresponding front guide rail 29 is a rack (not shown here) into which the pinion 33 engages for displacement of the sliding door 14. It is provided that, as is not further illustrated here, the rack and the guide rail are made in one piece.

It is further provided that the rack and the guide rail are made from plastic material.

As can be clearly seen in particular from FIGS. 35 and 38, the holding apparatus has a pivot stirrup 34 which is fixed in the region of the sliding door, being the rear region in the direction of travel of the vehicle, which stirrup 34 is connected to the sliding door 14 pivotably about a respective pivot axis which is vertical in the installed position, while with its other end it is mounted pivotably and slidably in a further guide rail 29. In this arrangement, at the other end the pivot stirrup 34 has a roller 35 with which it is supported pivotably and slidably in the guide rail 29.

LIST OF REFERENCES 1 energy guide chain system
2 sliding door system
3 energy guide chain
4 cable
5 connection point
6 connection point
7 entrainment portion
8 guide channel
9 passage
10 run
11 deflection region
12 arm
13 fastening side
14 sliding door
15 sliding block
16 sliding arm
17 slot
18 pin
19 pin head
20 pin neck
21 cable connection
22 channel
23 pivot arm
24 joint
25 ball joint
26 telescopic arm
27 telescopic member
28 telescopic member
29 guide rail
30 door opening
31 vehicle body
32 holding arm
33 pinion
34 pivot stirrup
35 roller
V displacement path
Y direction
X direction

The invention claimed is:

1. An energy guide chain system comprising an energy guide chain for guiding cables and hoses between a fixed and a movable connection point, an entrainment portion to which the energy guide chain is connected by way of the movable connection point, and a linear guide channel, wherein the energy guide chain is guided in the form of two runs which are guided in mutually parallel relationship and which are connected to each other by way of a deflection region, characterized in that the entrainment portion has an arm which projects transversely over the guide channel with a fastening side for connection to an apparatus which is movable relative to the fixed connection point, the arm movable relative to the guide channel and connected slidably in its longitudinal direction to the movable connection point and fastened by a non-pivoting connection to said apparatus and wherein the spacing between the fastening side of said arm and the energy guide chain is variable in a travel component in transverse relationship with the longitudinal direction of the runs of the energy guide chain, further characterised in that the guide channel in the form of a hollow profile with two oppositely disposed side walls adjacent to which the two runs and the deflection region of the energy guide chain are guided, wherein the hollow profile has a passage extending in the longitudinal direction for the entrainment portion, and that the entrainment portion is arranged entirely outside the space extending between the two runs.

2. An energy guide chain system according to claim 1 characterised in that the entrainment portion has a sliding block which is connected to said arm and which forms the movable connection point and is arranged displaceably in the passage of the guide channel.

3. A sliding door system for a vehicle comprising a vehicle body which has a door opening, and a sliding door which for opening and closing is displaceable along a path which is non-linear relative to the vehicle body, characterised by the energy guide chain system according to claim 1, which is arranged adjoining the door opening in the vehicle body or the sliding door and serves for guiding cables and hoses from the vehicle body to the sliding door, wherein the sliding door or the vehicle body respectively forms the apparatus which is movable relative to the guide channel.

4. A sliding door system for a vehicle comprising a vehicle body which has a door opening, and a sliding door which for opening is displaceable substantially parallel to the door opening outwardly entirely out of same along a non-linear path and which for closing is displaceable along the path into the door opening, comprising an energy guide chain system which is arranged adjoining the door opening in the vehicle body or the sliding door and serves for guiding cables and hoses from the vehicle body to the sliding door, wherein the energy guide chain system has an energy guide chain for guiding the cables and hoses, which is movable in the form of two runs which are arranged in mutually parallel relationship and which are connected to each other by way of a deflection region, and which has a fixed and a movable connection point for the cables and hoses, a linear guide channel and an entrainment portion to which the energy guide chain is connected by way of the movable connection point and which is provided with an arm which projects transversely over said channel, with a non-pivotable fastening side for connection to the sliding door or the vehicle body, and which extends entirely outside the space extending between the two runs, characterised in that the two runs extend linearly over the entire path and the arm of the entrainment portion is slidable in such a way that the spacing between the fastening side and the energy guide chain is variable in a travel component in transverse relationship with the longitudinal direction of the energy guide chain.

* * * * *